United States Patent
Suda et al.

(10) Patent No.: US 6,185,060 B1
(45) Date of Patent: *Feb. 6, 2001

(54) CHANGEOVER CIRCUIT IN TAPE RECORDER

(75) Inventors: Kazuyuki Suda, Chiba; Kazuo Murayama, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/915,395

(22) Filed: Aug. 20, 1997

(30) Foreign Application Priority Data

Aug. 29, 1996 (JP) .................................... 8-247050

(51) Int. Cl.7 .............................. G11B 15/12; G11B 5/02
(52) U.S. Cl. ............................................. 360/61; 360/67
(58) Field of Search .................................... 360/61, 67

(56) References Cited

U.S. PATENT DOCUMENTS 5,170,389 * 12/1992 Numata et al. .................. 369/116

5,877,911 * 3/1999 Klaassen et al. .................. 360/66

FOREIGN PATENT DOCUMENTS

363250913 * 10/1988 (JP) .

OTHER PUBLICATIONS

Kawamura, JP408273293A Abstract.

* cited by examiner

Primary Examiner—Hoa T. Nguyen
Assistant Examiner—Regina Y. Neal
(74) Attorney, Agent, or Firm—Jay H. Maioli

(57) ABSTRACT

A changeover circuit in a tape recorder includes a recording and reproducing integrated circuit (IC) having a signal terminal and a bias terminal and arranged such that a DC potential at the signal terminal is set equal to that at the bias terminal, a changeover transistor whose collector and emitter are connected between a signal line connected to the signal terminal and the bias terminal, a controller for controlling the changeover transistor by supplying an output therefrom through a resistor to a base of the changeover transistor, and a bypass circuit connected between the bias terminal and a ground. The bypass state of the bypass circuit is controlled based on a control voltage from the controller.

5 Claims, 2 Drawing Sheets

CHANGEOVER CIRCUIT IN TAPE RECORDER

BACKGROUND OF THE INVENTION

1. Field of the Invention

The present invention relates to a changeover circuit in a tape recorder.

2. Description of the Related Art

In many cases, a home-use tape recorder has a single head used as a recording head and a reproducing head. A circuit arrangement for such a common use is shown in FIG. 1, for example.

More specifically, reference numeral 10 denotes a recording/reproducing head for a tape recorder, and reference numeral 20 denotes a recording/reproducing integrated circuit (IC). In this case, the IC 20 has a recording circuit and a reproducing circuit which are integrated in one chip IC as a whole. Reference numeral 21 denotes an output amplifier at the final stage of the recording circuit; a reproducing equalizer amplifier 22 at the first stage of the reproducing circuit; and, a changeover switch 23 for switching recording/reproducing.

The IC 20 has external connection terminals (pins) T21 to T24. A power supply voltage VCC is applied to the terminal T21, and a capacitor C51 for high-frequency peaking in a reproducing state is connected to the terminal T22. A bypass capacitor C52 is connected to the terminal T23, and the terminal T24 is grounded.

A voltage forming circuit 24 is arranged in the IC 20. In the forming circuit 24, a DC voltage VBIAS (=VCC/2) which is ½ the power supply voltage VCC of the terminal T21 is generated. The voltage VBIAS is applied to the amplifiers 21, 22 and so on as a reference or bias voltage thereof, and is output to the terminal T23.

Reference numeral 30 denotes an oscillation circuit for an AC bias in a recording state, and reference numeral 40 denotes a changeover circuit for switching a signal line between a recording state and a reproducing state. In this case, the oscillation circuit 30 has an oscillation transformer M31, and an oscillation capacitor C31 is connected to the secondary coil L31 in parallel. The changeover circuit 40 has switching transistors Q41 and Q42 and transistors Q43 and Q44 for driving the changeover circuit 40. A voltage V41 higher than the voltage VBIAS is applied to a terminal T41, and a switching signal S42 which is set to "L" in a recording state and to "H" in a reproducing state is supplied to a terminal T42.

Since S42="L" is set in a recording state, the transistor Q44 is turned off to turn off the transistor Q43, thereby turning off the transistors Q41 and Q42. That is, the transistors Q41 and Q42 are equivalently disconnected.

In addition, in the recording state, the changeover switch 23 is connected in the state shown in FIG. 1, and a recording audio signal is extracted from the output amplifier 21. The audio signal is supplied to the head 10 through a signal line formed of the amplifier 21, the changeover switch 23, the terminal T22, the head 10, the parallel circuit formed of the recording equalizer capacitor C53 and a resistor R51, a parallel circuit formed of coil L31 and the capacitor C31, the capacitor C52, the ground, and the terminal T24.

At this time, an AC bias signal is extracted from the coil L31 of the transformer M31 of the oscillation circuit 30, and the AC bias signal is supplied to the head 10 through a signal line formed of the coil L31, the elements C53 and R51, the head 10, the capacitor C51, the ground, the capacitor C52, and the coil L31.

Therefore, the audio signal from the amplifier 21 is AC-bias-recorded on a tape (not shown).

Since S42="H" is set in the reproducing state, the transistor Q44 is turned on to turn on the transistor Q43, thereby turning on the transistors Q41 and Q42. In the reproducing state, the changeover switch 23 is connected in a reverse state of the state shown in FIG. 1.

Therefore, the lower end portion of the recording/reproducing head 10 in FIG. 1 is connected to the IC 20 through a signal line formed of the head 10, the transistor Q41, Q42, the capacitor C52, the ground, and the terminal T24 in this order. For this reason, a reproducing signal from the head 10 is supplied to the amplifier 22 through a signal line constituted by the head 10, the terminal T22, the changeover switch 23, and the amplifier 22.

Therefore, the reproducing signal from the head 10 is subjected to a reproducing equalization process or the like to be supplied to the circuit at the following stage.

In this manner, in the tape recorder shown FIG. 1, the head 10 is used as recording and reproducing heads by the changeover switch 40.

Since a DC potential at the output terminal of the amplifier 21 and a DC potential at the input terminal of the amplifier 22 are generally set to VCC/2, a DC potential at the terminal T22 is also set to VCC/2. However, the voltage VBIAS is output to the terminal T23, and VBIAS=VCC/2 is established. Though, even if the head 10 is directly connected to the terminal T22 (even if a capacitor for cutting a DC current is not connected), no DC current flows in the head 10.

In the above changeover circuit 40, the transistors Q41 and Q42 are in an ON state during a reproducing process. However, when the ON resistances thereof are large, the transistors are easily affected by hum noise. For this reason, the ON resistance thereof must be decreased.

In order to decrease the ON resistances, transistors each having a large current amplification factor hFE are preferably used as the transistors Q41 and Q42. The transistor having a large current amplification factor hFE is expensive, so that the cost of the tape recorder increases.

Therefore, a current I40 flowing through the transistors Q41 and Q42 may be increased to decrease the ON resistances thereof.

The current I40 flows from the terminal T41 into the transistors Q41 and Q42 through the transistor Q43 and respective resistors R41 and R42. The current I40 further flows from the transistors Q41 and Q42 into the IC 20 through the terminal T23 to be a load on the voltage forming circuit 24. At this time, the voltage forming circuit 24 is originally used to provide the reference voltage VBIAS to the internal circuits of the IC 20, and is constituted without considering a current flowing thereinto from the terminal T23. Therefore, when the current I40 flows into the terminal T23 and its increases, the voltage VBIAS at the terminal T23 rises.

When the voltage VBIAS rises, in the IC 20, the operating points of the circuits 21 and 22 and the like using the voltage VBIAS as a reference voltage or a bias voltage are shifted, and hence malfunction occurs. Therefore, the ON resistances of the transistors Q41 and Q42 cannot be decreased by increasing the current I40.

SUMMARY OF THE INVENTION

The present invention has been made to solve the above problems.

Therefore, according to the present invention, there is provided a changeover switch having a signal terminal and a bias terminal. The signal terminal is connected to an IC whose DC potential is made equal to that of the bias terminal. The collector-emitter of a first switching transistor is connected between a signal line connected to the signal terminal and the bias terminal, a voltage for ON/OFF-controlling the first switching transistor is applied to the base of first switching transistor through a resistor, a separate resistor and the collector-emitter of a separate switching transistor are connected in series between the bias terminal and the ground, and the ON/OFF-controlling voltage is applied to the base of the above separate switching transistor to ON/OFF control the separate switching transistor similar to the first switching transistor.

Therefore, a current flowing into first switching transistor when the transistor is in an ON state bypasses through the separate transistor.

DESCRIPTION OF THE PREFERRED EMBODIMENT

Figure 1:
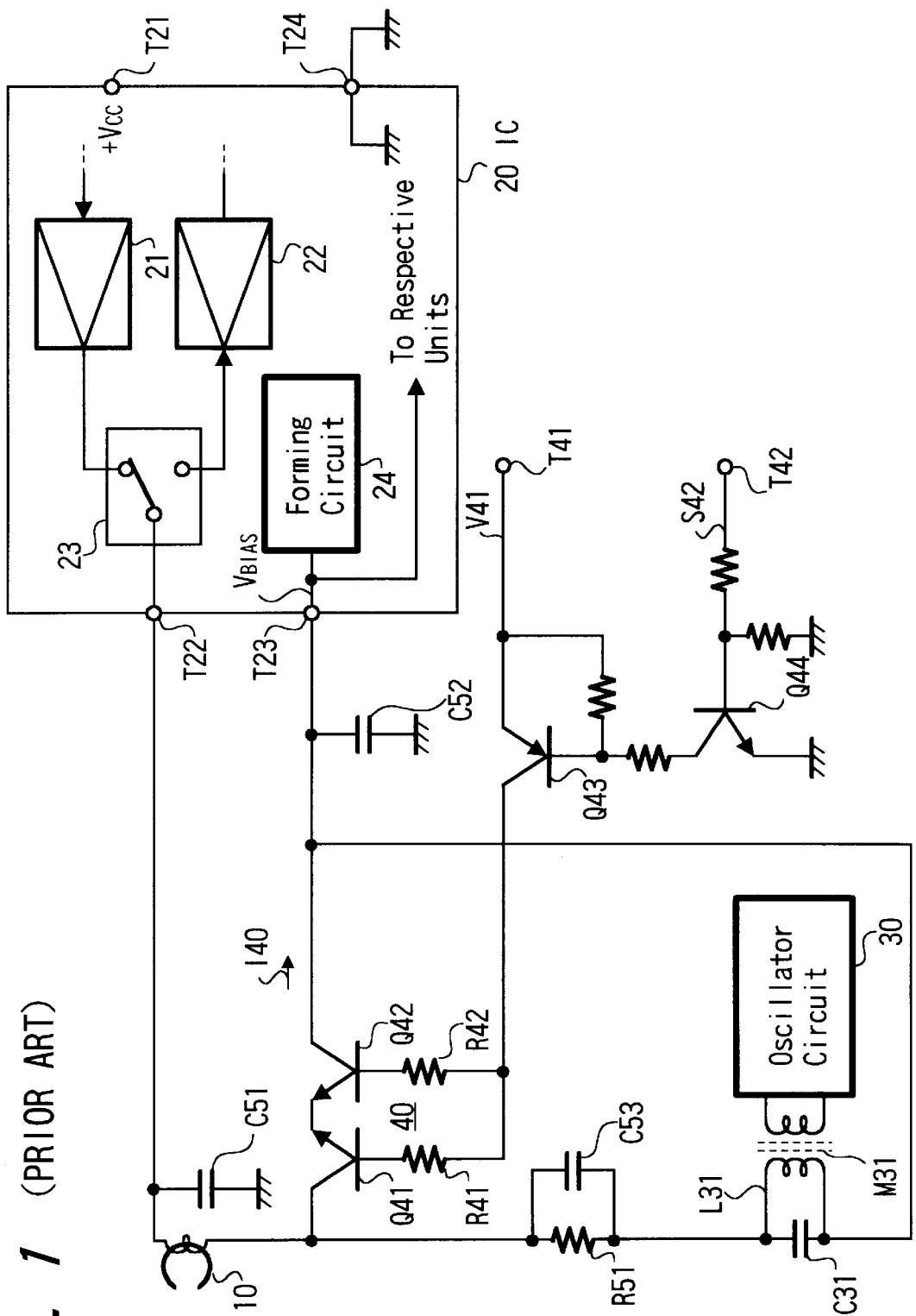
FIG. 1 is a diagram showing a circuit arrangement of a commercial-purpose tape recorder according to the prior art.
Figure 2:
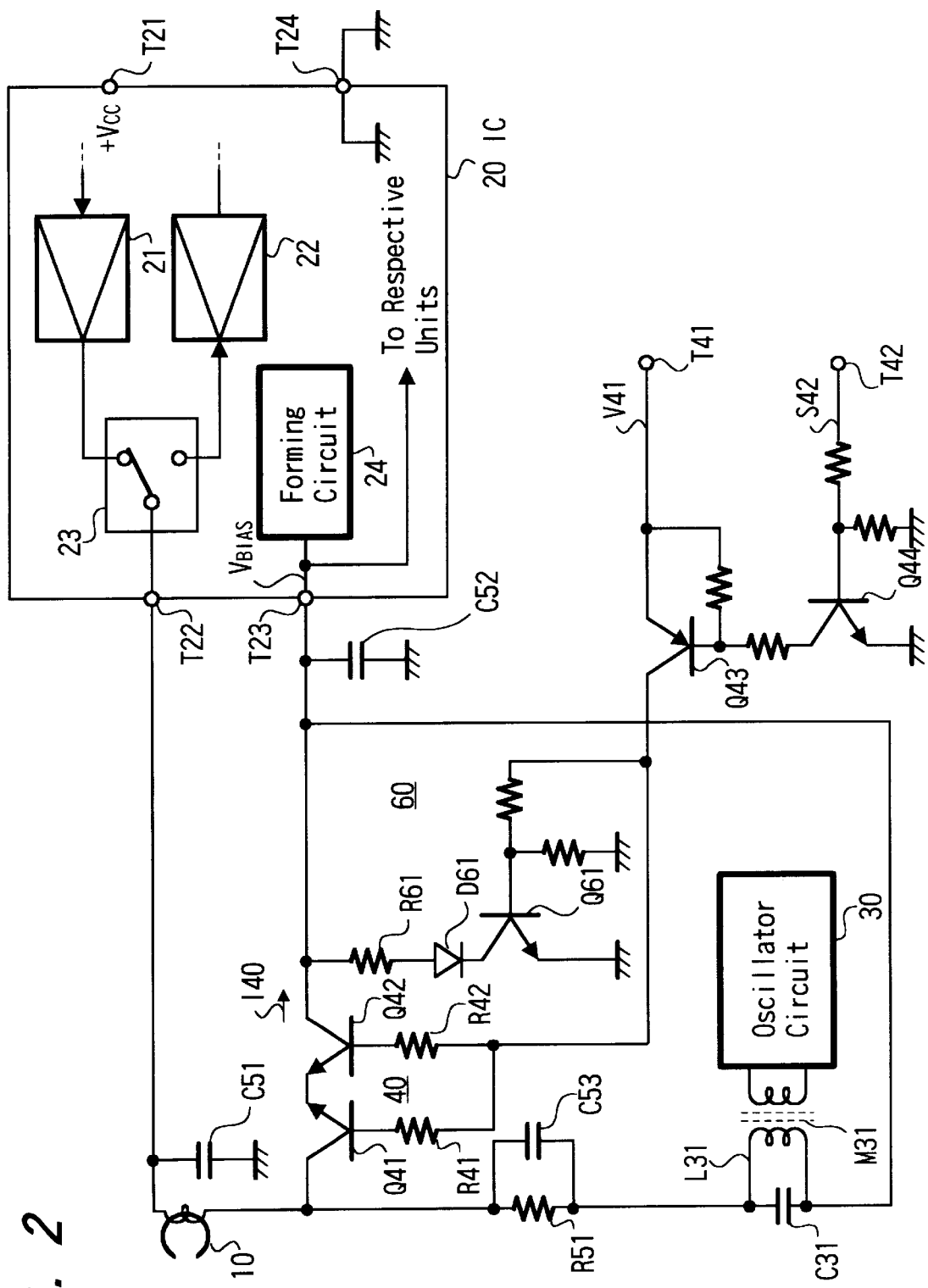
FIG. 2 is a diagram showing a circuit arrangement of a tape recorder according to an embodiment of the present invention.

Referring to FIG. 2, a head 10, an IC 20, a bias oscillation circuit 30, a changeover switch 40 and so on are connected or arranged as explained in connection with in FIG. 1.

As shown in FIG. 2, a bypass circuit 60 has the following arrangement. That is, a current setting resistor R61, a temperature-compensating diode D61, and the collector-emitter of a switching transistor Q61 are connected in series between a terminal T23 of the IC 20 and the ground, and a collector output from a transistor Q43 is supplied to the base of the transistor Q61.

In this case, for example, if R41=R42 is established, the following equation can be obtained:

R61=R41/2

With the above arrangement, since S42="L" is set in a recording state, a transistor Q44 is turned off to turn off the transistor Q43, thereby turning off the transistors Q41 and Q42. Since the transistor Q43 is in an OFF state, the transistor Q61 is also in an OFF state. Therefore, the current I40 from the transistors Q41 and Q42 does not flow into the terminal T23, and any other external currents do not flow into the same terminal.

In the recording state, as described above, a recording audio signal is extracted from the terminal T22 of the IC 20, and the audio signal is supplied to the head 10 through a signal line formed of the terminal T22, the head 10, the capacitor C53 and the resistor R51, the coil L31 and the capacitor C31, the capacitor C52, and the ground which are connected in this order. Therefore, the audio signal is recorded on a tape (not shown).

Since S42="H" is set in a reproducing state, the transistor Q44 is turned on to turn on the transistor Q43, thereby turning on the transistors Q41 and Q42. Further, a changeover switch 23 is connected in a reverse state to that illustrated in FIG. 2.

Therefore, the lower end portion of the head 10 in FIG. 2 is connected to the IC 20 through a signal line formed of the terminal T22, the head 10, the transistors Q41 and Q42, the capacitor C52, and the ground which are connected in that order. For this reason, a reproducing signal from the head 10 is supplied to the amplifier 22 through a signal line formed of the head 10, the terminal T22, the changeover switch 23, and the amplifier 22 which are connected in that order. That is, a reproducing process is performed.

In this case, since the transistors Q41 and Q42 are set in an ON state, a current I40 flows out of the transistors Q41 and Q42. At this time, since the transistor Q43 is in an ON state, the transistor Q61 is also in an ON state. Therefore, the current I40 from the transistors Q41 and Q42 bypasses through a current line formed of the transistor Q42, the resistor R61, the diode D61, the collector-emitter of the transistor Q61, and the ground which are connected in that order, and does not flow into the terminal T23.

More specifically, when the value of the resistor R61 is set to the above value, since the current I40 flows through the resistor R61, a DC potential (relative to the ground) at the connection point between the collector of the transistor Q42 and the resistor R61 is equal to the voltage VBIAS. Since the DC potential is equal to the voltage VBIAS at the terminal T23, the current I40 does not flow into the terminal T23, and a current does not flow out from the terminal T23.

Therefore, even if the transistors Q41 and Q42 are turned on, the DC voltage VBIAS at the terminal T23 does not change. For this reason, in the IC 20, even if the amplifiers 21 and 22 use the voltage VBIAS as a reference voltage or a bias voltage, the operating points thereof are not shifted.

Even if the transistors Q41 and Q42 are turned on as described above, the DC voltage VBIAS at the terminal T23 does not change. For this reason, the ON resistances of the transistors Q41 and Q42 can be decreased by increasing the current I40. Therefore, influence of hum noise or the like can be hardly exerted thereon.

At this time, transistors each having a large current amplification factor hFE need not be used as the transistors Q41 and Q42, and a simple element is only added. For this reason, an increase in cost can be minimized.

Even if the base-emitter voltages of the transistors Q41 and Q42 change by a change in temperature to change the current I40, if a change in current I40 can be absorbed by the voltage forming circuit 24, the diode D61 can be omitted. When the series circuit between the collectors and the emitters of the transistors Q41 and Q42 is connected between the signal line and the terminal T23, a muting circuit can be constituted. In that case, the present invention can be also applied.

According to the present invention, even if the changeover transistor is turned on, an operating point of a circuit which uses a DC voltage at a terminal connected to the transistor as a reference voltage or a bias voltage is not shifted. Therefore, the ON resistance of the changeover transistor is decreased by increasing a current flowing when the transistor is in an ON state, thereby reducing influence of hum noise or the like.

At this time, a transistor having a large current amplification factor hFE need not be used as the changeover transistor, and a simple element is only added. Therefore, an increase in cost can be minimized.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. Apparatus for recording/reproducing a tape, comprising:

a recording/reproducing head;

a recording/reproducing circuit for connection to one side of the recording/reproducing head and having a voltage generating circuit for generating a reproducing bias voltage;

a mode switching circuit for switching between a recording mode and a reproducing mode in response to a mode control voltage applied thereto;

signal pass switching means connected to the other side of the recording/reproducing head for controllably connecting the reproducing bias voltage from the voltage generating circuit with the other side of the recording/reproducing head in the reproducing mode in accordance with the mode control voltage from the mode switching circuit and wherein an AC bias recording circuit is also connected to the other side of the recording/reproducing head; and bypass means activated by the mode control voltage and connected to a junction of the signal pass switching means and the voltage generating means to avoid supplying surplus current through the signal pass switching means to the voltage generating circuit in the reproducing mode.

2. The apparatus according to claim 1, wherein said bypass means comprises a bypass transistor arranged such that a resistor and a collector-emitter of said bypass transistor are connected in series between an output of said voltage generating means and ground, said bypass transistor being supplied with said mode control voltage and thereby brought into its on-state or off-state, and hence its bypass state is controlled.

3. The apparatus according to claim 2, wherein said signal pass switching means comprises a changeover transistor and further comprising:

a bypass capacitor connected between said output of said voltage generating circuit and ground; and the recording/reproducing head, a recording equalizer element, and an output coil of the AC bias recording circuit are connected in series between a signal terminal of the recording/reproducing circuit and the voltage generating means, wherein a collector-emitter of said changeover transistor is connected between a connection point of said recording/reproducing head with said recording equalizer element and said voltage generating means.

4. The apparatus according to claim 3, wherein, upon recording, a recording signal is fed to said signal terminal, and said changeover transistor and said bypass transistor are set in respective off-states, and upon reproduction, said changeover transistor and said bypass transistor are set in respective on-states, and a reproducing signal from said recording/reproducing head is supplied to said signal terminal.

5. The apparatus according to claim 4, wherein a value of said resistor is set so that a current flowing in said changeover transistor when said changeover transistor and said bypass transistor are in said on-states is equal to a current flowing in said bypass transistor.

* * * * *